(12) United States Patent
Du et al.

(10) Patent No.: US 12,332,509 B2
(45) Date of Patent: Jun. 17, 2025

(54) SYSTEMS AND METHODS FOR DIFFRACTIVE COHERENT LASER COMBINING

(71) Applicant: The Regents of the University of California, Oakland, CA (US)

(72) Inventors: Qiang Du, Pleasanton, CA (US); Russell B. Wilcox, Berkeley, CA (US); Tong Zhou, San Pablo, CA (US); Lawrence R. Doolittle, Walnut Creek, CA (US); Gang Huang, Fremont, CA (US); Derun Li, Concord, CA (US)

(73) Assignee: The Regents of the University of California, Oakland, CA (US)

( * ) Notice: Subject to any disclaimer, the term of this patent is extended or adjusted under 35 U.S.C. 154(b) by 1092 days.

(21) Appl. No.: 17/237,384

(22) Filed: Apr. 22, 2021

(65) Prior Publication Data

US 2021/0341764 A1 Nov. 4, 2021

Related U.S. Application Data

(60) Provisional application No. 63/017,105, filed on Apr. 29, 2020.

(51) Int. Cl.
G02B 27/10 (2006.01)
G02B 27/42 (2006.01)
(Continued)

(52) U.S. Cl.
CPC ....... *G02F 1/0121* (2013.01); *G02B 27/1086* (2013.01); *G02B 27/4277* (2013.01);
(Continued)

(58) Field of Classification Search
None
See application file for complete search history.

(56) References Cited

U.S. PATENT DOCUMENTS

| | | | | |
|---|---|---|---|---|
| 7,339,727 B1 * | 3/2008 | Rothenberg | .......... | H01S 3/2383 359/349 |
| 7,733,930 B2 * | 6/2010 | Livingston | ......... | B23K 26/0613 372/102 |

(Continued)

OTHER PUBLICATIONS

Du et al., "81-beam coherent combination using a programmable array generator," Optics Express, vol. 29, No. 4, pp. 5407-5418, (Feb. 15, 2021).

(Continued)

*Primary Examiner* — Eric L Bolda (57) ABSTRACT

This disclosure provides systems, methods, and apparatus related to optical systems. In one aspect, a method includes: generating a plurality of laser beams; receiving the plurality of laser beams at the point at a diffractive optical element, the diffracting optical element diffracting the plurality of laser beams to generate a plurality of output laser beams including a central laser beam and a plurality of side laser beams; measuring a power of at least two of the plurality of output laser beams generated by the diffractive optical element; determining a phase error in laser beams of the plurality of laser beams from the power of the at least two of the plurality of output laser beams; and changing the phase N−1 laser beams of the plurality of laser beams, with N being a number of the plurality of laser beams.

20 Claims, 11 Drawing Sheets

(51) Int. Cl.
    *G02F 1/01*     (2006.01)
    *H01S 3/00*     (2006.01)
    *H01S 3/067*     (2006.01)
    *H01S 3/23*     (2006.01)

(52) U.S. Cl.
    CPC ........ *H01S 3/0085* (2013.01); *H01S 3/06754* (2013.01); *H01S 3/23* (2013.01); *G02F 2203/50* (2013.01)

(56) References Cited

U.S. PATENT DOCUMENTS

| | | | |
|---|---|---|---|
| 10,444,526 B2 | 10/2019 | Wilcox | |
| 2007/0201795 A1* | 8/2007 | Rice | ........................ H01S 3/005 385/39 |
| 2008/0084598 A1* | 4/2008 | Rothenberg | ....... B23K 26/0613 359/238 |

OTHER PUBLICATIONS

Du et al., "Deterministic stabilization of eight-way 2D diffractive beam combining using pattern recognition," Optics Express, vol. 44, No. 18, pp. 4554-4557 (Sep. 15, 2019).

Du et al., "Stabilization of Diffractive Beam Combining Using Pattern Recognition," in Conference on Lasers and Electro-Optics, OSA Technical Digest (Optical Society of America, 2019), paper SM4E.5.

Wang et al., "Stabilization of the 81-channel coherent beam combination using machine learning," Optics Express, vol. 29, No. 4, pp. 5694-5709, (Feb. 15, 2021).

Zhou et al., "Coherent combination of ultrashort pulse beams using two diffractive optics," Optics Letters, vol. 42, No. 21, pp. 4422-4425 (2017).

Zhou et al., "Two-dimensional combination of eight ultrashort pulsed beams using a diffractive optic pair," Optics Letters vol. 43, No. 14, pp. 3269-3272 (2018).

Zhou et al., "Coherent Beam Combining of Fiber Amplifiers Using Stochastic Parallel Gradient Descent Algorithm and Its Application," IEEE Journal of Selected Topics in Quantum Electronics, vol. 15, No. 2, pp. 248-256, (Mar./Apr. 2009).

Augst et al., "Coherent beam combining and phase noise measurements of ytterbium fiber amplifiers," Optics Letters vol. 29, No. 5, pp. 474-476 (2004).

Leger et al., "Coherent laser addition using binary phase gratings," Applied Optics vol. 26, No. 20, pp. 4391-4399 (1987).

Rothenberg et al., "Advances and Limitations in Beam Combination of Kilowatt Fiber Amplifiers," Proc. SPIE vol. 7686, Laser Technology for Defense and Security VI, 768613 (May 4, 2010).

* cited by examiner

SYSTEMS AND METHODS FOR DIFFRACTIVE COHERENT LASER COMBINING

RELATED APPLICATIONS

This application claims priority to U.S. Provisional Patent Application No. 63/017,105, filed Apr. 29, 2020, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to lasers and more particularly to systems and methods for combining laser beams.

BACKGROUND

High-energy, high-repetition-rate, ultrafast fiber lasers can be used in advanced particle accelerators and other applications. Due to the limited energy from fiber amplifiers (~10 mJ), however, hundreds of beams need to be coherently added to produce Joule-level outputs. We recently demonstrated a scalable method of adding ~100 fs pulse beams, using diffractive optical elements (DOE) (U.S. Pat. No. 10,444,526). The combiner is an optical interferometer with precise control of the phase in each beam, and this needs some method of detecting the phase errors to be corrected. The combining goal is to achieve maximum efficiency (combined beam power with respect to the sum of input beam powers) with the fastest and most accurate feedback.

A common method of control, stochastic parallel gradient descent (SPGD), randomly dithers all the phase inputs and searches for an optimum set of values. Since there is only one measured output, the method is potentially subject to local maxima, and the control delay scales with the number of beams. The steps required for SPGD to converge is roughly a factor of 10 times the number of beams to combine, which brings the feedback bandwidth down to an impractical ~1 Hz if 100 beams were combining at the 1 kHz repetition rate (which is the sampling rate). Additionally, the combining efficiency and stability suffers from the noise introduced by dithering.

Another way of phase detection is to use a common reference beam, which interferes with a fraction of each input beam in free space, to measure the phase errors. This is a deterministic measurement, but increases system complexity, requiring additional optical paths with interferometric stability.

SUMMARY

Described herein is a method for controlling diffractive, high-power beam combination, by sensing phase errors by analyzing the intensity pattern of uncombined side beams at the output. As described in an example herein, a square array of eight beams was combined with <0.3% stability and 84.6% efficiency. As the channel count is increased, so does the usable information, enabling scaling to large channel counts without significant slowing of control loop response time, an advantage over single-input algorithms.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Embodiments described herein can be implemented with the systems, methods, and apparatus described in U.S. Pat. No. 10,444,526, issued Oct. 15, 2019, which is herein incorporated by reference.

The following examples of the systems, methods, and apparatus for combining eight laser beams with diffractive optical elements (DOEs) are intended to be examples of the embodiments disclosed herein, and are not intended to be limiting.

We developed a deterministic phase detection scheme that uses beam power information derived from a camera to find an error signal for each beam. This information resides in the side beams rejected by the combiner.

Figure 1:
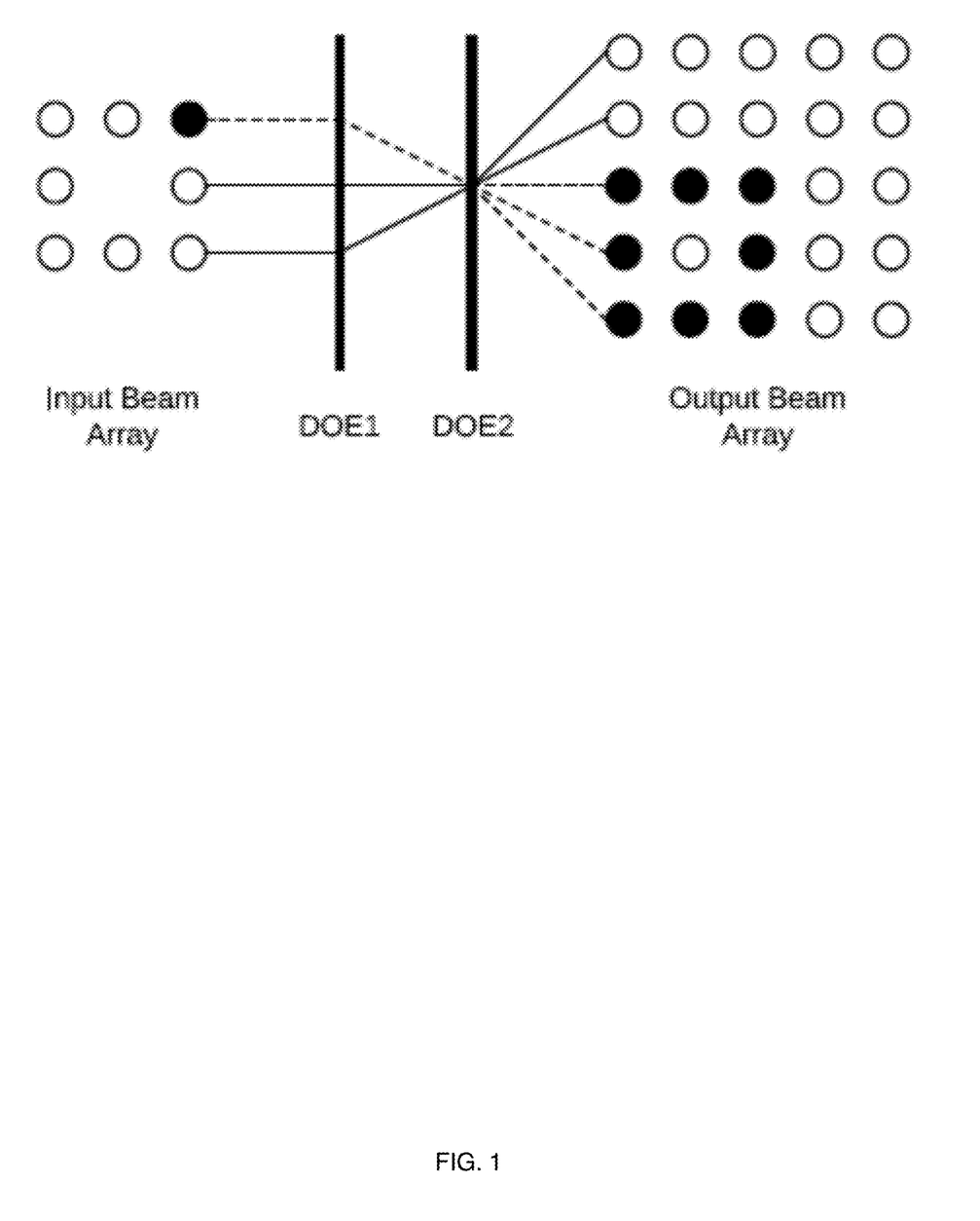
FIG. 1 shows an example of a schematic illustration of 2D coherent combining using two DOEs.

FIG. 1 shows the beam paths into and out of the diffractive combiner. The N=8 input beams are aligned in a 3×3 array in free space with equal power. The first element, DOE1, applies pulse front tilt to each beam, compensating the tilt introduced by the combining element. The second element, DOE2, is a diffractive splitter operated in reverse. Since each input beam is, by itself, split into eight output beams that overlap with adjacent beams, there will be 25 outputs for eight inputs. Ideally, all but the central beam are minimized, but they will not be zero, and can provide information. In order to theoretically determine the 25-spot pattern given a set of input beam phases, we need to know the relative phases of the outputs from one input beam. In general, these output phases will not all be zero, will be asymmetric about the axes of the combiner, and are exactly the input beam phases needed to achieve efficient combination. This set of phases is a characteristic of the combining element, and can be found experimentally by correlating the intensities of output spots contributed to by only two input beams with the relative phase between those input beams. With that information, we can predict the output spot pattern given any set of amplitudes and phases of the inputs.

As a beam splitter, the DOE diffracts the incident light into many output beams. At the far field after the DOE, the periodic grating pattern translates to sampling of its 2D Fourier transform, which defines the DOE transmission transfer function. The beam size and (Gaussian) spatial beam profile act as a window function. As a result, amplitude- and phase-diffracted beams are experimentally measurable, denoted as a complex array d(x,y), where x, y is the location index relative to the zero-order beam at the center. In our case, first orders of d(x,y) will be d3×3, $$d(x, y) = D_{xy} e^{i\theta_{xy}},$$

$$d_{3\times3} = \begin{pmatrix} 1 & e^{i\theta_{0,1}} & e^{i\theta_{1,1}} \\ e^{i\theta_{-1,0}} & 0 & e^{i\theta_{1,0}} \\ e^{i\theta_{-1,-1}} & e^{i\theta_{0,-1}} & e^{i\theta_{1,-1}} \end{pmatrix}.$$

The phases are defined with respect to the top-left element. In our case, the DOE is built with a specification of equal amplitude of all ±1 order beams in a M×M (where M=3) array, with the zero-order (center) mostly suppressed. The input beam array should have the same intensity pattern as d3×3 and with phases $\phi_{xy}$ must be found, $$b(x,y) = A_{xy} e^{i\phi_{xy}}, x,y \in [-1,0,1].$$

FIG. 1 shows the optical paths and diffracted beam array. At the combining DOE, an input beam at (m,n), which is $$\left(\frac{M-1}{2} - m, \frac{M-1}{2} - n\right)$$

away from center, is injected at an angle such that its diffracted beams are spatially shifted by $$\left(m - \frac{M-1}{2}, n - \frac{M-1}{2}\right)$$

with respect to the zero-order location at the far-field output plane. Then, the diffracted beam intensity just depends on the incident beams' interference condition and is distributed as a function of the output diffraction angle. Superposition of all beams' diffraction patterns creates a complex matrix $s_{out}$ at the detection plane, whose intensity is measurable by a camera or photodiode array. This diffraction and superposition process can be seen as 2D convolution between the incident beam complex array b(x,y) and the DOE transfer function complex array d, except the indices are mirrored in both dimensions due to the optical paths crossing at the combiner. The following discussion flips $s_{out}$ back as s for convenience, which can be done either optically or numerically in experiment.

$$s(x, y) = \sum_{m=-\infty}^{\infty} \sum_{n=-\infty}^{\infty} b(x, y) d(x - m, y - n) \quad (1)$$
$$= b(x, y) ** d(x, y).$$

While the indices cover all possible orders of diffraction, only a few will be non-negligible. In practice, even with the highest efficiency in combining, the uncombined beams will never be zero and can be used for phase detection.

Optimal combining requires that all incident beams are constructively interfered at the zero-order diffracted beam located at (0, 0). Selecting the first incident beam as the phase reference, ∠b(−1,1)=0, the optimal incident beam phase condition (operation point) for coherent diffractive combining can be defined as $$\phi_{x,y} = -\theta_{-x,-y}.$$

This means that the optimal input beam phases will be the same as the combining element's (DOE2's) phases when operated as a splitter, except that the indices are reflected around the x and y axes.

From Eq. (1), an M×M incident beam array going through a matched DOE would create (2M−1)² diffracted beams. The desired condition of coherent combining is to have maximum amplitude at the combined (center) beam with minimum at all other locations. Because the beam paths are perturbed by environment, one has to actively correct optical phase in real time, in order to achieve and maintain optimal stabilization.

The first step is to identify d(x,y) by measuring |s(x,y)| from the interference of the diffracted beams due to the two adjacent incident beams at different locations.

For two incident beams b(x,y) and b(m,n), the intensity of interference between their diffracted beams at x+m, y+n directly reveals the phase difference $$s(x+m, y+n) = A_{xy} e^{i(\phi_{xy} + \theta_{mn})} + A_{mn} e^{i(\phi_{mn} + \theta_{xy})}$$

$$|s(x+m, y+n)|^2 = 2A_{xy} A_{mn} \cos(\Delta\phi - \Delta\theta) + A_{xy}^2 + A_{mn}^2$$

where $\Delta\phi = \phi_{xy} - \phi_{mn}$ and $\Delta\theta = \phi_{xy} - \theta_{mn}$. For equal amplitudes $A_{xy} = A_{mn} = 1$, we have $$|s(x+m, y+n)| = 2\cos\frac{\Delta\phi - \Delta\theta}{2}. \quad (2)$$

Figure 2A:
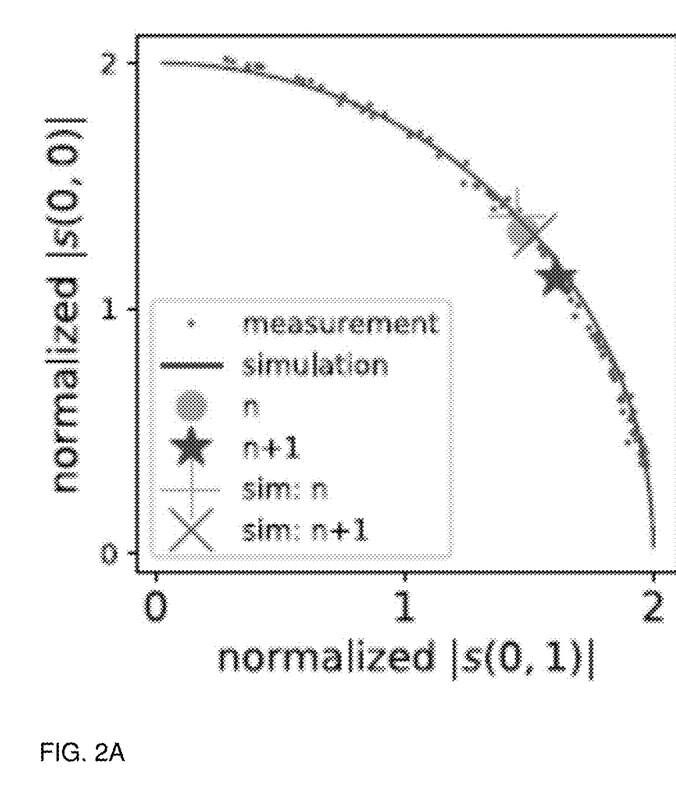
FIGS. 2A and 2B show examples of diffracted beam amplitude cross correlations when only $b(-1,1)$ and $b(-1,0)$ are input to DOE2.
Figure 2B:
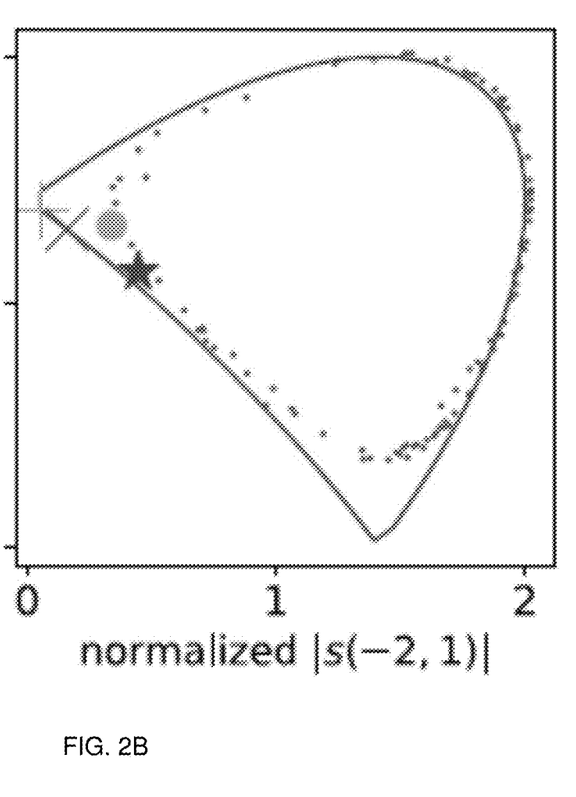

FIGS. 2A and 2B show the measured and theoretical amplitude cross correlations between the two overlapping elements in the diffracted beam array when only two incident beams b(−1,1) and b(−1,0) are passed through, taken from 100 video frames (with 10 frames per second rate) from the far-field camera, as phases are allowed to drift. Each dot represents one video frame. It is clear that the diffracted beams have ±90° or ±45° phase relationships, where the signs can be determined by directions of change, which are indicated by markers from two adjacent frames. There are six such cross correlations between the output beams due to two inputs (only two are shown).

By analyzing different combinations of two-beam interference, we conclude that the measured first-order DOE transfer function is as in Eq. (3).

$$d_{3\times 3} = \begin{pmatrix} 1 & i & 1 \\ 1 & 0 & -i \\ -1 & 1 & 1 \end{pmatrix}. \quad (3)$$

Simulation confirms this estimation is consistent with measurement, as shown in FIGS. 2A and 2B. It is possible to include higher order diffracted beam phase analysis, but only first orders are considered.

It is necessary for coherent stabilization to measure the sign of phase errors, which is typically unavailable from intensity detectors such as a camera. However, under certain DOE characteristic phase array conditions, a reduced set of the diffracted beam intensities can work as phase detectors. We have identified such a condition, and developed a feedback control method by stabilizing the intensities of these points.

Looking at the number of contributors to the diffracted beam array, one can always find eight points where there are only two beams interfering, typically next to the corners in s(x,y), $$\begin{pmatrix} 1 & 1 & 1 \\ 1 & 0 & 1 \\ 1 & 1 & 1 \end{pmatrix} ** \begin{pmatrix} 1 & 1 & 1 \\ 1 & 0 & 1 \\ 1 & 1 & 1 \end{pmatrix} = \begin{pmatrix} 1 & \boxed{2} & 3 & \boxed{2} & 1 \\ \boxed{2} & 2 & 4 & 2 & \boxed{2} \\ 3 & 4 & 8 & 4 & 3 \\ \boxed{2} & 2 & 4 & 2 & \boxed{2} \\ 1 & \boxed{2} & 3 & \boxed{2} & 1 \end{pmatrix}.$$

From interference Eq. (2), we know that the intensity is a cosine function of phase error, and would provide a "slope" for feedback if $\Delta\theta - \Delta\theta \neq 0$ at the optimal combining phase condition.

$$\frac{\partial |s(x+m, y+n)|}{\partial \Delta\phi} = -\sin\frac{\Delta\phi - \Delta\theta}{2} \neq 0.$$

Therefore, the condition for direct feedback using the reduced set of two-beam interference is $$\begin{cases} \phi_{x,y} = -\theta_{-x,-y} & \forall\, x, y \in \left[-\frac{M-1}{2}, \ldots, \frac{M-1}{2}\right]. \\ \phi_{x,y} - \phi_{m,n} \neq \theta_{x,y} - \theta_{m,n} & |x+m| + |y+n| = 2M - 3 \end{cases}$$

This translates to the requirement that the characteristic phase of DOE2 is asymmetric. Fortunately, a high-efficiency DOE splitter/combiner tends to have this characteristic. In general, for a M×M shape DOE, $$\theta_{m,n} + \theta_{-m,-n} \neq \theta_{x,y} + \theta_{-x,-y},$$

$$|x+m| + |y+n-| = 2M-3.$$

In other words, the adjacent summations of diagonal elements in DOE2's characteristic phase array must be different. Under this condition, there is a unique mapping between the diffracted beam intensity array $|s(x,y)|^2$ and the incident beam phase $\angle b(x,y)$, which makes it possible to have deterministic phase feedback from pattern recognition.

Figure 3A:
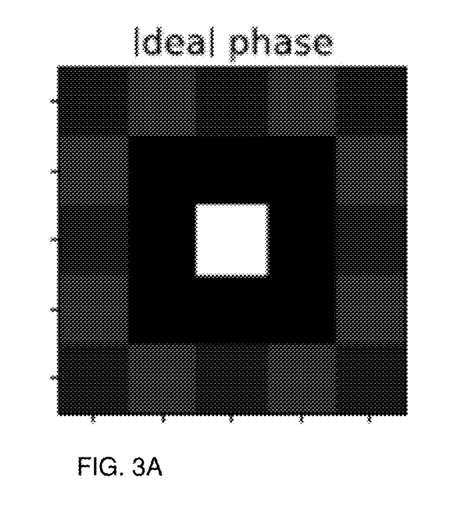
FIGS. 3A-3C show examples of diffracted beam pattern with ideal phases, and for upper left corner input beam phase perturbed by minus and plus 90 degrees.
Figure 3B:
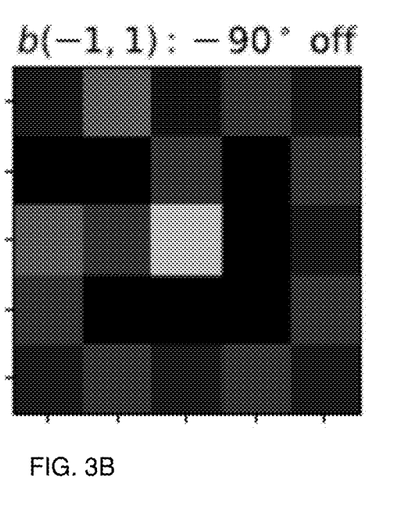
Figure 3C:
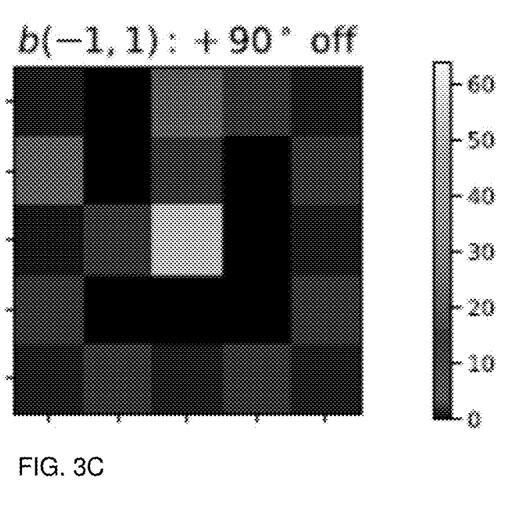

Simulations using $d_{3\times 3}$ show that the diffracted beam intensity patterns are asymmetric for positive and negative phase errors, suggesting that error magnitude and direction can be derived, as shown in FIGS. 3A-3C.

Figure 4A:
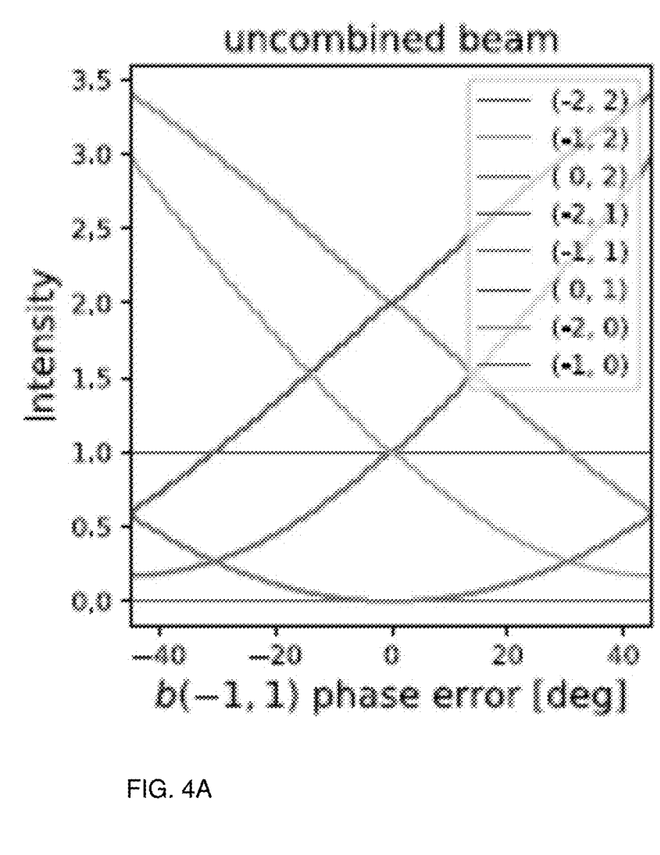
FIG. 4A shows and example of the theoretical intensities of eight beams of the "reduced set" versus phase error.
Figure 4B:
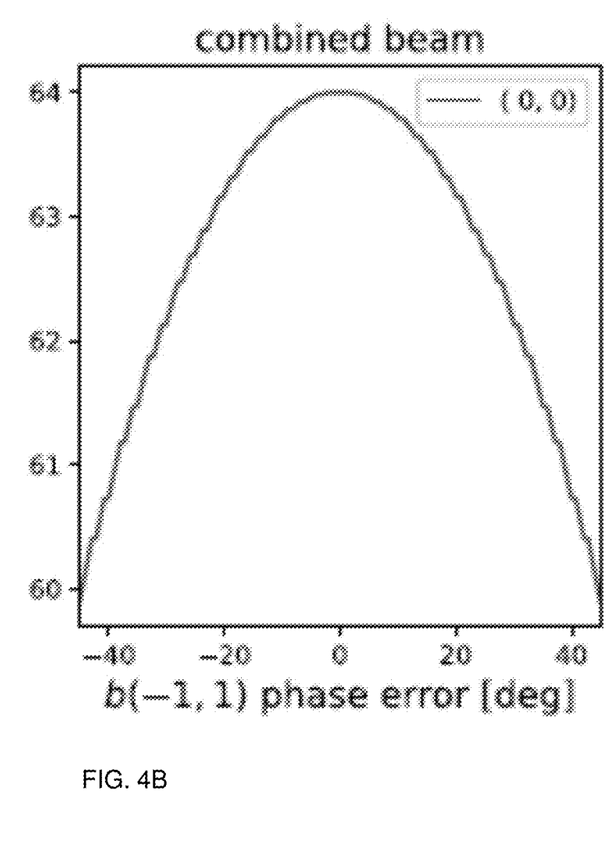
FIG. 4B shows and example of combined beam intensity versus phase error.

Scanning $\angle b(-1,1)$ in simulation reveals the signs for feedback using $|s(-1,2)|$ and $|s(-2,1)|$, as shown in FIGS. 4A and 4B.

For balanced and normalized amplitudes, the reduced-set intensity array $\vec{I}$ is a function of beam phase difference array $\Delta\vec{\phi}$, $$\vec{I} = 2(\cos(\Delta\vec{\phi} - \Delta\vec{\theta}) + 1)$$

$$\frac{\partial \vec{I}}{\partial \Delta\vec{\phi}} = -2\sin(\Delta\vec{\phi} - \Delta\vec{\theta}).$$

The diffracted beam pattern variation $d\vec{I}$ is then proportional to the phase difference error array $d\Delta\vec{\phi}$ times the sign of slope, $$d\vec{I} \propto d\Delta\vec{\phi} \cdot \text{sgn}\left(\frac{\partial \vec{I}}{\partial \Delta\vec{\phi}}\right),$$

where for our measured $d_{3\times 3}$, around the operating point, we have $$\text{sgn}\left(\frac{\partial \vec{I}}{\partial \Delta\vec{\phi}}\right)(x, y) = \begin{pmatrix} & + & & + & \\ - & & & & + \\ - & & & & + \\ & - & & - & \end{pmatrix}.$$

In order to map from eight elements of a phase difference error array to seven phase shifter voltages for feedback, we use linear least squares to solve this overdetermined system. In practice, because only phase difference matters, we move the eighth phase shifter to the average amount of phase error, so the system locking range is maximized. Given a set point of $\vec{I}$, one can apply a many-input-many-output proportional-integral controller in software to stabilize the reduced-set intensities to achieve and maintain the optimal combined state, which is defined and tunable by $\vec{I}$.

Figure 5:
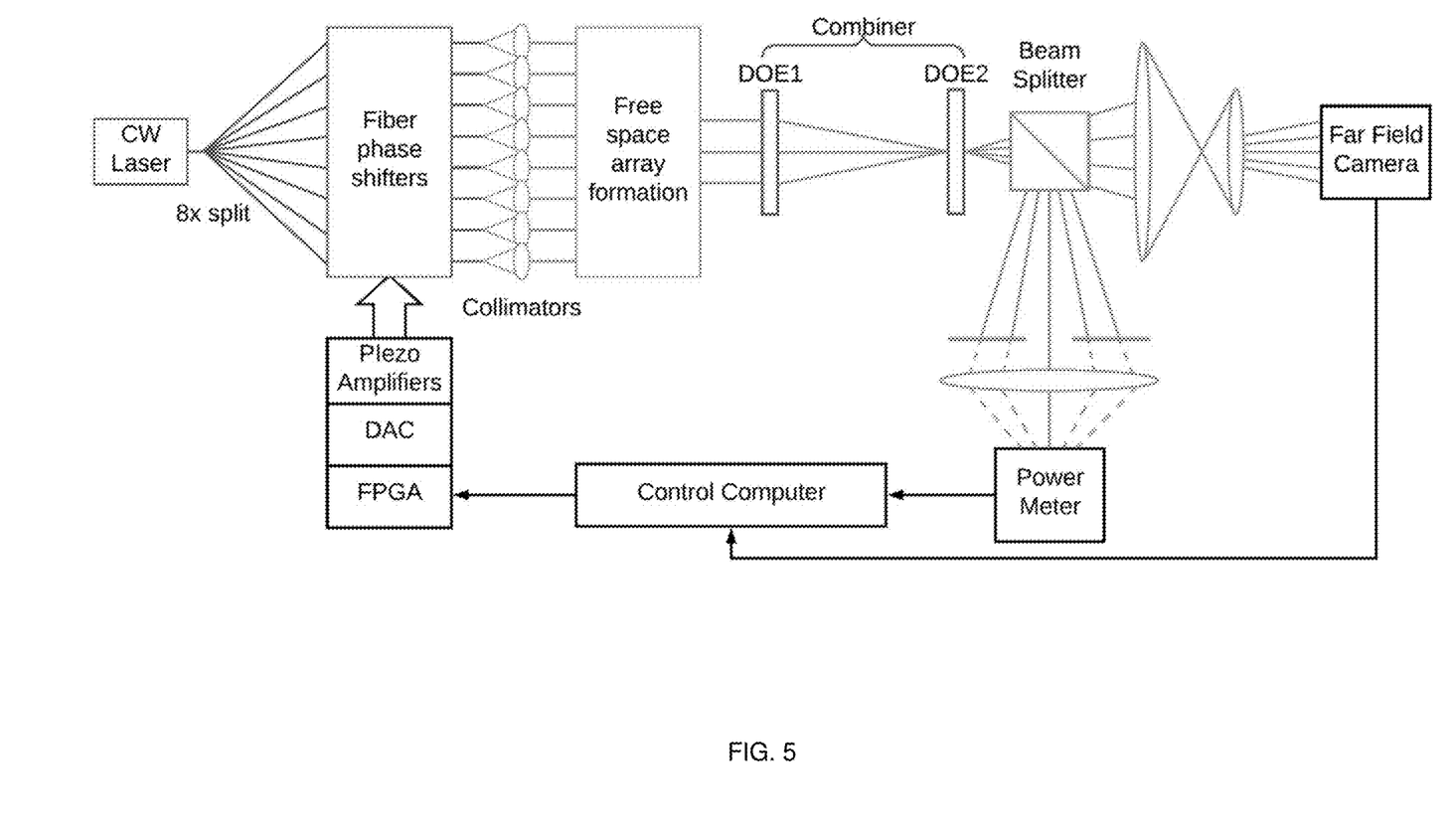
FIG. 5 shows an example of an experimental setup, including a digital-to-analog converter (DAC) and a field-programmable gate array (FPGA).

The experimental setup is shown in FIG. 5. A single-frequency CW laser at 1060 nm is split into eight fiber channels, each of which is electronically phase controlled. The powers of the eight input beams are balanced ~15 μW each, and the total input power variation is ~0.3% rms. The output beams are formed into a 2D array and input to the diffractive combiner. The output spot intensities are recorded on the far-field camera (8 bit, 800×800 pixels) and analyzed in software to derive the phase errors. The correction signals drive piezoelectric fiber phase shifters in the fiber array. The feedback control bandwidth is limited by the far-field camera frame rate, which is about 16.7 Hz. A separate measurement is made of the central, combined spot using a power meter. All measurements are sampled synchronously at 16.7 Hz.

Figure 6A:
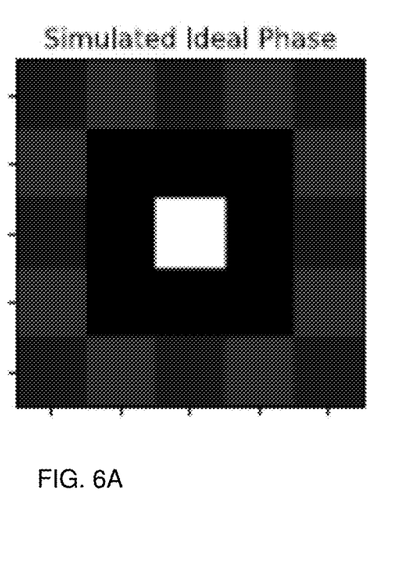
FIGS. 6A-6C show examples of simulated and measured diffracted beam intensities.
Figure 6B:
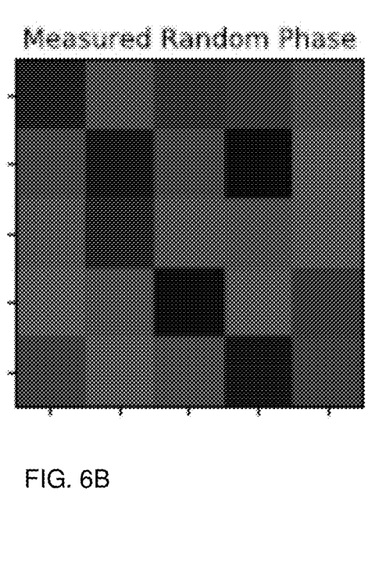
Figure 6C:
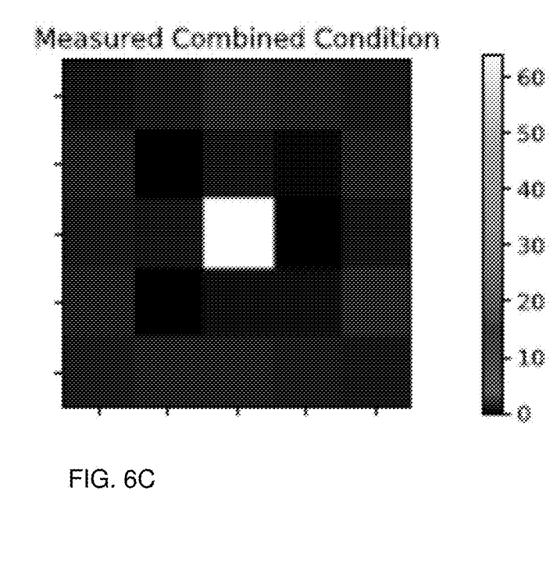
Figure 7A:
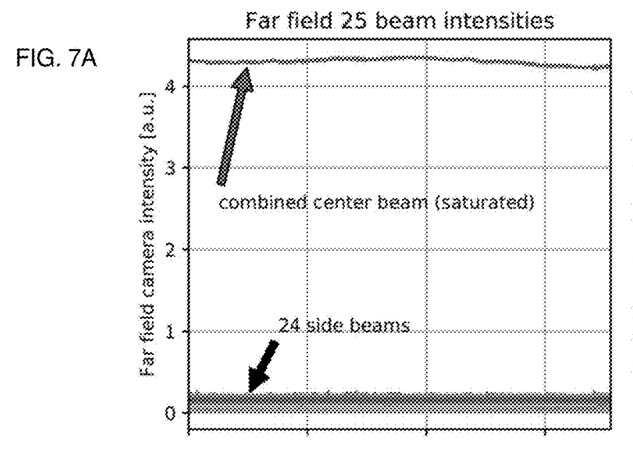
FIGS. 7A-7D show examples of measurements from one closed-loop data set.
Figure 7B:
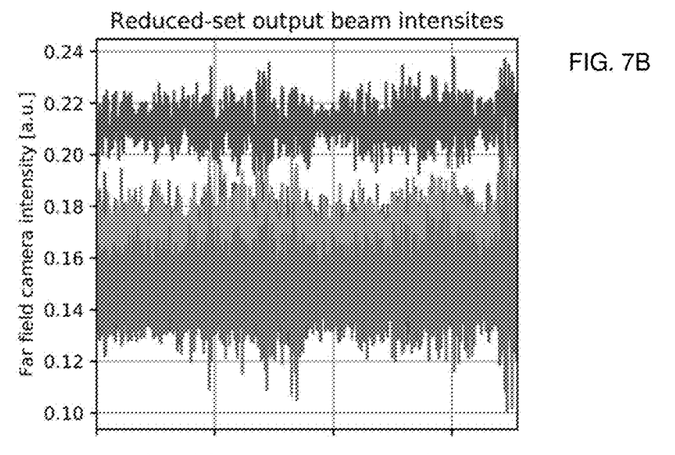
Figure 7C:
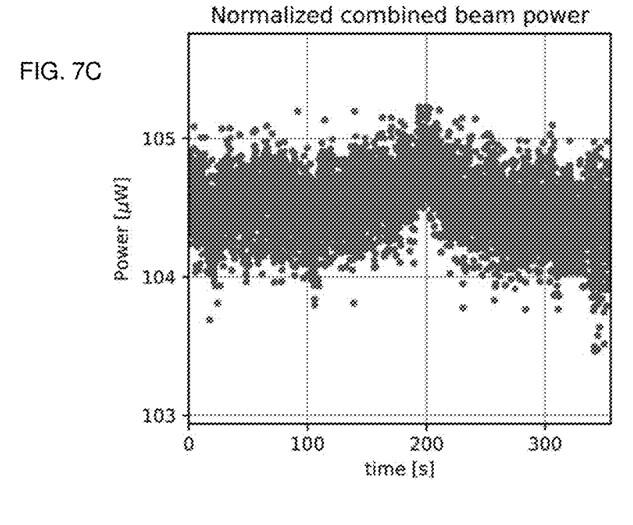
Figure 7D:
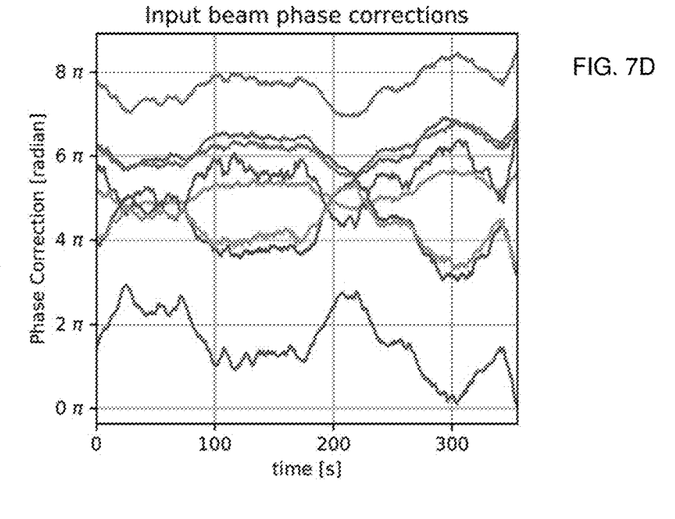

We compared the measured results with simulation using the ideal amplitude and phase condition, as shown in FIGS. 6A-6C. The diffracted beam intensities are measured by a far-field camera in the free-running condition and the controlled combining condition, and normalized to a calibrated power meter reading, to correct for saturation of the camera by the combined beam. Despite variations in the relative beam powers, camera nonlinearity, and calibration inaccuracy, the system model approximates the experimental data, including higher orders in the DOE model that would help improve the theoretical combining efficiency, higher than our first-order estimation. However, because the first-order response dominates, higher order diffracted beams will not change the monotonic phase detection slope at the reduced-set locations.

FIGS. 7A-7D show the resulting intensity values for the measured spots and the central spot, when the control loop is closed. We normalized the output power measurement to a simultaneously acquired total input power measurement, to find the variation due to combining stability only. The combined beam power is stable to within 0.22% rms as measured by a power meter after an iris, which is independent of the control loop. The combining efficiency η—defined as the ratio of the central combined beam power to the total power from all 25 diffracted beams—is measured to be 84.6% using the power meter, by inserting or removing the iris to block/unblock uncombined beams. This is close to the 90.7% intrinsic efficiency of DOE2, measured by configuring it as a beam splitter.

The experiment described here uses a CW source for convenience. We have demonstrated that an identical combiner works for 120 fs pulses with high efficiency. In practice, the power and delay variation for each beam needs to be made stable (about 10% relative power and 10% of pulse width) in order to achieve high efficiency. Also, the pointing stability must be good enough to give a single interference fringe across the beam for the combiner to work at all. These requirements can be met by an optical setup with good mechanical stability and thermal control, plus a slow control loop for coarse delay. We intend to combine high-energy chirped pulses to be compressed to ~100 fs, allowing for about three waves of phase error before loss becomes significant due to delay variation. While the loop is closed, the accumulated phase error of each beam can be tracked by phase shifter control voltages. For larger phase drift beyond the phase shifter range (in our case >8π), it is possible to record the automatic resetting of the phase shifters' drive function after multiple 2π excursion, and compensate with a coarse delay using a separate control loop.

We have shown that, for a small number of beams, higher order side beams can be used to derive phase error information sufficient to stabilize the combination. This method is deterministic, does not require careful calibrations, is tolerant to (currently) uncontrolled errors including amplitude unbalance, and is potentially scalable. Since phase corrections are derived from a single image, it locks quickly and robustly, recovering from an unlocked condition in a single operation. Our output stability result is achieved even without the output power being in the loop. For larger numbers of input beams M>3, there would still be eight reduced-set points where only two beams interfere, and locking their intensities would stabilize the phase difference between the corner input beams and the beams next to them, so that the system control dimensionality could be reduced; additional "layers" of stabilization could be applied to other beams.

Method

Figure 8:
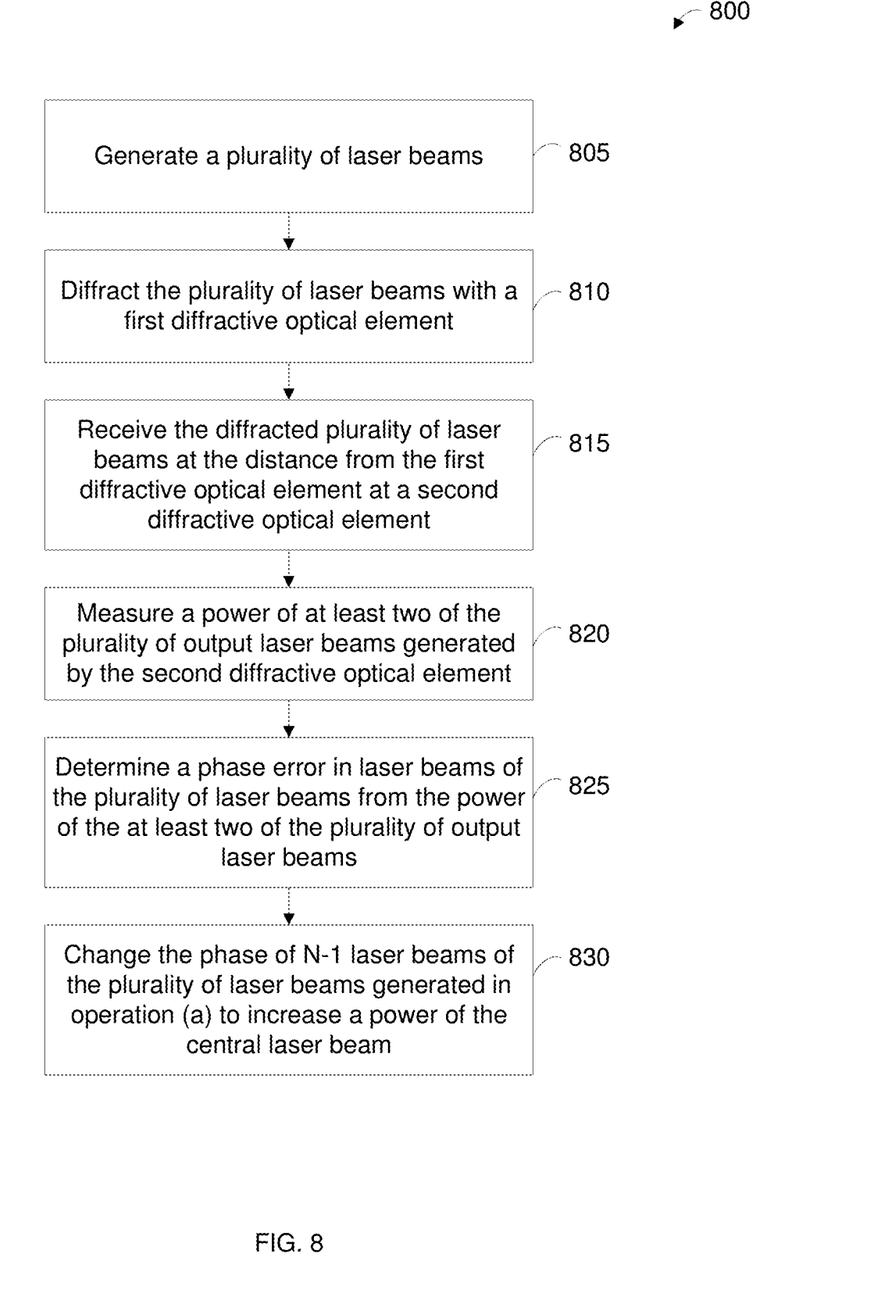
FIG. 8 shows an example of a flow diagram illustrating a process for combining laser beams.

Generalizing the above example, FIG. 8 shows an example of a flow diagram illustrating a process for coherently combining laser beams. In some embodiments, the laser beams are pulsed laser beams. In some embodiments, the laser beams are continuous-wave laser beams. Starting at block 805 of the method 800 shown in FIG. 8, a plurality of coherent laser beams is generated. Each laser beam of the plurality of laser beams has a phase. In some embodiments, the plurality of laser beams is generated by one or more fiber laser amplifiers.

In some embodiments, each of the plurality of laser beams is less than about 1 picosecond in duration. In some embodiments, each of the plurality of laser beams is about 10 femtoseconds to 500 femtoseconds in duration. In some embodiments, a power of each laser beam of the plurality of laser beams is about 0.1 milliwatts to 10 kilowatts. For example, the power of each laser beam may be in the sub-milliwatt range to the kilowatt range.

In some embodiments, laser beams of the plurality of laser beams are arranged in a one-dimensional (1-D) array or a two-dimensional (2-D) array prior to block 810. The 1-D array may be 1×2, 1×3, or 1×4 array, for example. The 2-D array may be a square array or a rectangular array. The 2-D array may be a 2×2, 3×3, or 4×4 array, for example. In some embodiments, an odd array may be more efficient in increasing a power of a central beam than an even array.

Returning to the method 800 shown in FIG. 8, at block 810 the plurality of laser beams is diffracted with a first diffractive optical element so that the plurality of laser beams converges a distance from the first diffractive optical element. Each laser beam of the plurality of laser beams is substantially parallel to one another prior to the diffracting.

At block 815, the diffracted plurality of laser beams is received at the distance from the first diffractive optical element at a second diffractive optical element. The second diffractive optical element diffracts the plurality of laser beams to generate plurality of output laser beams including a central laser beam and a plurality of side laser beams. In some embodiments, the first diffractive optical element induces a pulse front tilt in laser beams of the plurality of laser beams. In some embodiments, the second diffractive optical element removes the pulse front tilt in laser beams of the plurality of laser beams.

At block 820, a power of at least two of the plurality of output laser beams generated by the second diffractive optical element is measured. That is, the power of all of or a subset of the plurality of output laser beams is measured. In some embodiments, a power of at least two of the plurality of side laser beams generated by the second diffractive optical element is measured. The minimum number of output laser beams for which the power needs to be measured to perform the method 800 is related to the number laser beams at block 805 for which the phase is to be controlled. In each dimension (i.e., a 1-D array or each dimension of a 2-D array), the number of output laser beams generated (i.e., the side laser beams plus the central laser beam) is 2N−1, where N is the number of laser beams at generated at operation 805. Thus, for each case, only N−1 phase corrections need to be performed. For example, when two laser beam are being combined, the total beams generated at block 815 would be three (i.e., one central laser beam and two side laser beams). Two side laser beams would be used to perform a phase correction in one of the laser beams generated at block 805.

At block 825, a phase error in laser beams of the plurality of laser beams is determined from the power of the at least two of the plurality of output laser beams. In some embodiments, the phase error is determined with a deconvolution method (e.g., a two-dimensional deconvolution method). At blocks 820 and 825, a power of output laser beams is measured to determine a phase error in input laser beams (i.e., laser beams generated at block 805).

At block 830, the phase of N−1 laser beams of the plurality of laser beams generated at block 805 is changed to increase a power of the central laser beam. N is the number of the plurality of laser beams generated at block 805. For example, if two laser beams were being combined, the phase of one of the laser beams would be changed relative to the other laser beam. In some embodiments, the power of the central laser beam is maximized.

System

Figure 9:
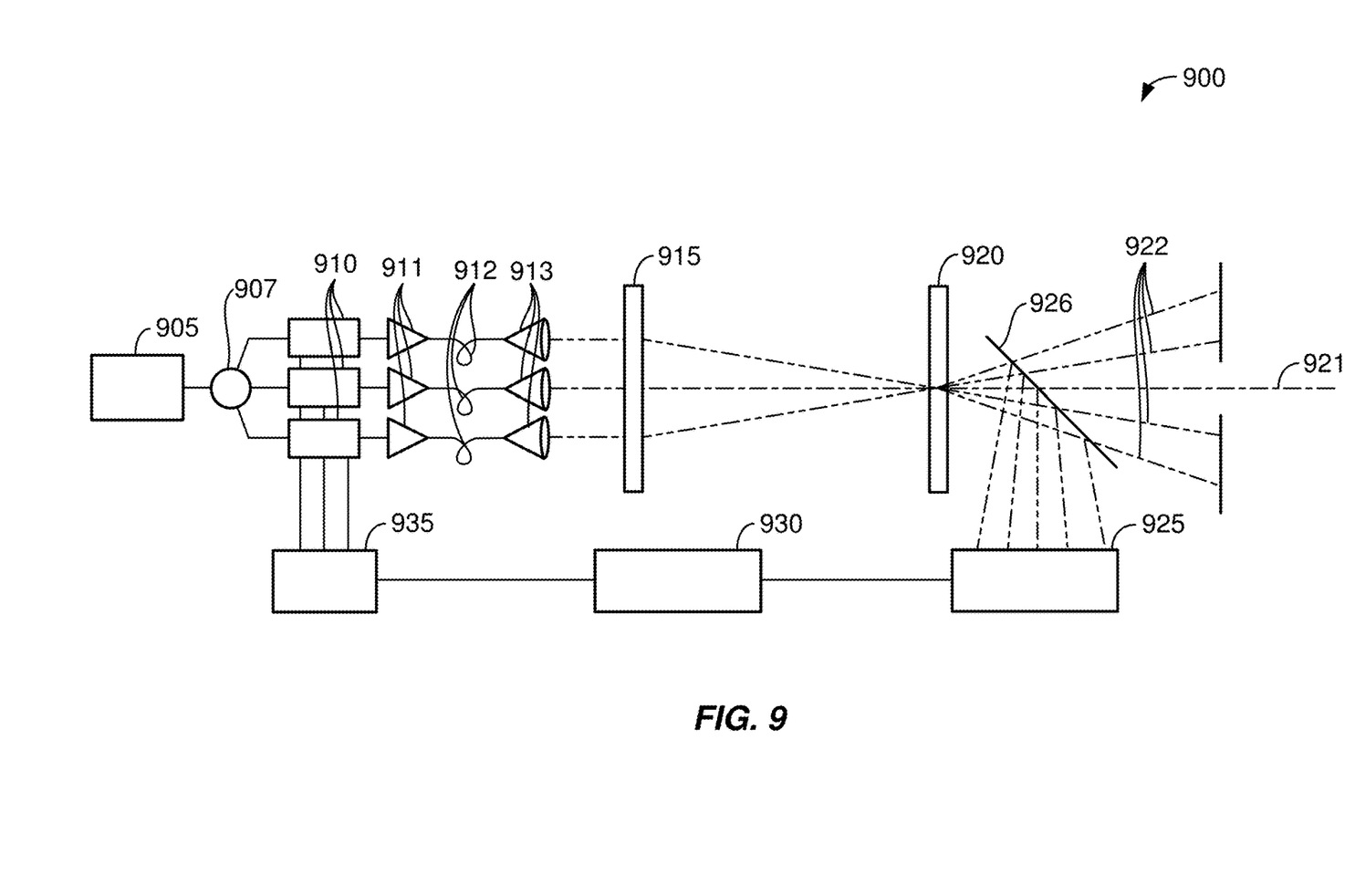
FIG. 9 shows an example of a schematic illustration of a system operable to combine laser beams.

FIG. 9 shows an example of a schematic illustration of a system operable to combine laser beams. Embodiments of the system 900 shown in FIG. 9 can be used to combine laser beams, implementing embodiments of the method 800 shown in FIG. 8.

The optical system 900 includes an optical source 905, a plurality of phase shifters 910, a first diffractive optical element 915, a second diffractive optical element 920, a detection device 925, a processor 930, and a driver 935. The optical source 905 is operable to generate a plurality of laser beams. In some embodiments, each laser beam of the plurality of laser beams is a pulsed laser beam. In some embodiments, each laser beam of the plurality of laser beams is a continuous-wave laser beam. In some embodiments, the optical source 905 generates a single laser beam which passes through a beam splitter 907 to generate the plurality of laser beams. In some embodiments, the optical source 905 comprises a plurality of optical sources, with each optical source generating one of the plurality of laser beams. In some embodiments, the optical source 905 comprises one or more fiber lasers. In some embodiments, the optical source 905 has a pulse rate of about 1 kHz to 1 MHz.

Each phase shifter of the plurality of phase shifters 910 is operable to shift a phase of one of the plurality of laser beams generated by the optical source 905. That is, there is one phase shifter for each of the plurality of laser beams generated. In some embodiments, the plurality of phase shifters 910 comprise fiber phase shifters or free space phase shifters. In some embodiments, each of the plurality of laser beams generated by the optical source 905 passes through an amplifier 911 and a collimator 913 before the first diffractive optical element 915. In some embodiments, the laser beams travel from an amplifier 911 to a collimator 913 via an optical fiber 912.

The first diffractive optical element 915 is operable to receive the plurality of laser beams and then to diffract the plurality of laser beams. In some embodiments, laser beams of the plurality of laser beams received by the first diffractive optical element 915 are arranged in one-dimensional array or a two-dimensional array. In some embodiments, the first diffractive optical element 915 comprises a grating array. The grating array includes a plurality of individual gratings, with a number of the plurality of individual gratings is equal to a number of the plurality of laser beams. In some embodiments, each of the plurality of individual gratings comprises a blazed grating.

The second diffractive optical element 920 is operable to receive the diffracted plurality of laser beams and to generate a plurality of output laser beams including a central laser beam 921 and a plurality of side laser beams 922. In some embodiments, the second diffractive optical element 920 comprises a beam splitter. In some embodiments, the beam splitter is oriented to combine the diffracted plurality of laser beams to generate the central laser beam 921. In some embodiments, the first diffractive optical element 915 induces a pulse front tilt in laser beams of the plurality of laser beams. In some embodiments, the second diffractive optical element 920 removes the pulse front tilt in diffracted laser beams of the diffracted plurality of laser beams. In some embodiments, the first diffractive optical element 915 and the second diffractive optical element 920 comprise transmissive optical elements.

The detection device 925 is operable to measure a power of at least two of the plurality of output laser beams. In some embodiments, a beam splitter 926 is used to direct the plurality of output laser beams 922 to the detection device 925. In some embodiments, the detection device 925 comprises a camera (e.g., a far-field camera) or a photodiode array. In some embodiments, a sampling rate of the detection device 925 is the pulse rate of the laser beams generated by the optical source 905.

The processor 930 and the driver 935 comprise the control system of the optical system. The processor 930 may be part of a computing system. The processor 930 is operable to determine a phase error in a laser beam of the plurality of laser beams from the power of the at least two of the plurality of output laser beams. This phase error information is used to instruct the driver 930 to direct phase shifters of the of the plurality of phase shifters 910 to change the phase of N−1 laser beams of the N laser beams generated by the optical source 905 to increase a power of the central laser beam 921. In some embodiments, the driver 930 includes a field-programmable gate array (FPGA), a digital-to-analog converter (DAC), and piezoelectric amplifiers.

Method

Figure 10:
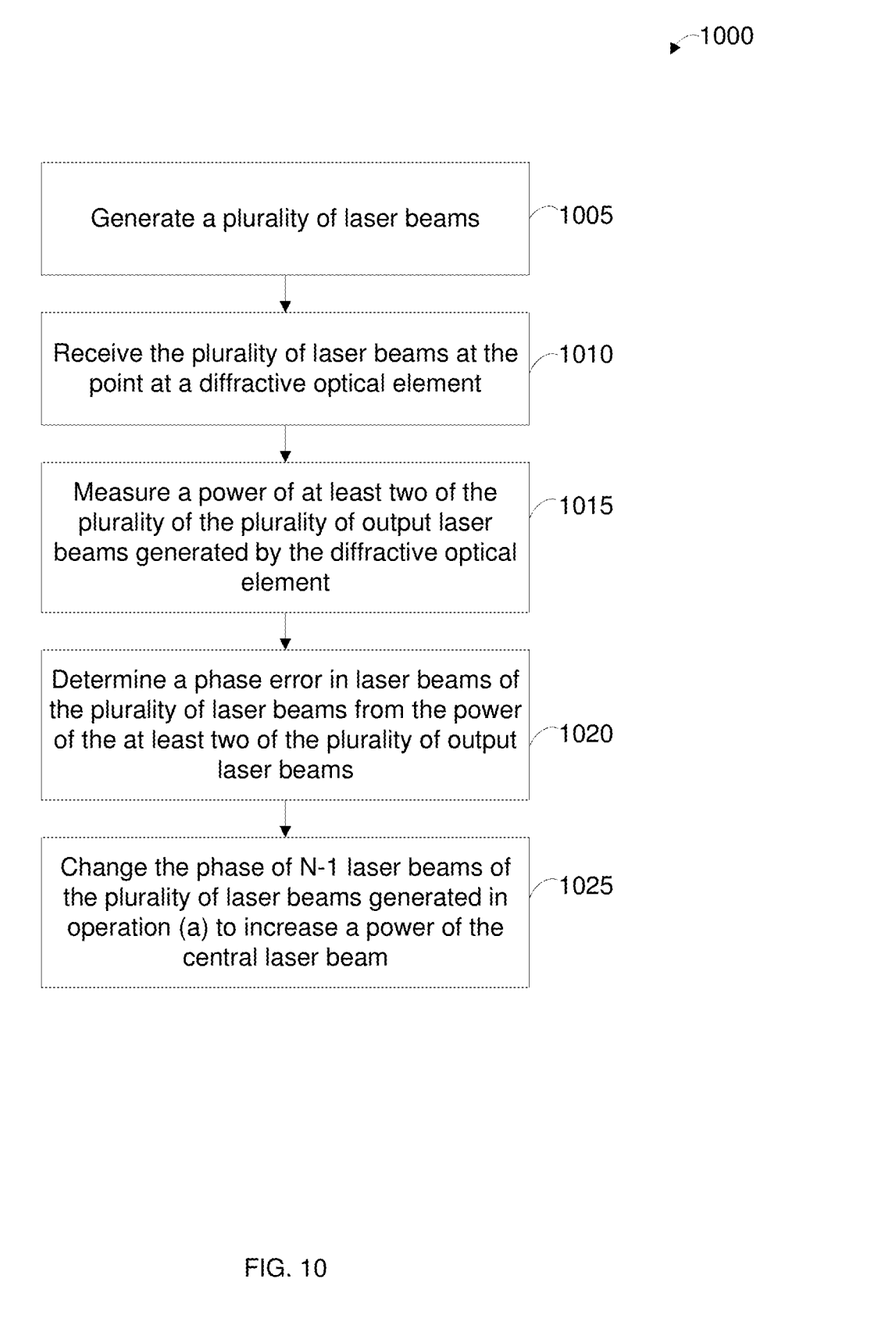
FIG. 10 shows an example of a flow diagram illustrating a process for combining laser beams.

Generalizing the above example again, FIG. 10 shows an example of a flow diagram illustrating a process for combining laser beams, specifically continuous-wave (CW) laser beams. Operations in the method 1000 shown in FIG. 10 are similar to or the same as operations in the method 800 shown in FIG. 8.

Starting at block 1005 of the method 1000 shown in FIG. 8, a plurality of coherent laser beams is generated. Each laser beam of the plurality of laser beams is a continuous-wave laser beam. Each laser beam of the plurality of laser beams has a phase. Each laser beam of the plurality of laser beams converges at a point.

In some embodiments, a power of each laser beam of the plurality of laser beams is about 0.1 milliwatts to 10 kilowatts. For example, the power of each laser beam may be in the sub-milliwatt range to the kilowatt range.

In some embodiments, laser beams of the plurality of laser beams are arranged in a one-dimensional (1-D) array or a two-dimensional (2-D) array prior to converging at the point. The 1-D array may be 1×2, 1×3, or 1×4 array, for example. The 2-D array may be a square array or a rectangular array. The 2-D array may be a 2×2, 3×3, or 4×4 array, for example. In some embodiments, an odd array may be more efficient in increasing a power of a central beam than an even array.

Returning to the method 1000 shown in FIG. 10, at block 1010 the plurality of laser beams is received at the point at a diffractive optical element. The diffractive optical element diffracts the plurality of laser beams to generate a plurality of output laser beams including a central laser beam and a plurality of side laser beams. At block 1015, a power of at least two of the plurality of output laser beams generated by the diffractive optical element is measured. In some embodiments, a power of at least two of the plurality of side laser beams generated by the diffractive optical element is measured. At block 1020, a phase error in laser beams of the plurality of laser beams is determined from the power of the at least two of the plurality of output laser beams. In some embodiments, the phase error is determined with a deconvolution method (e.g., a two-dimensional deconvolution method). At blocks 1015 and 1020, a power of output laser beams is measured to determine a phase error in input laser beams (i.e., laser beams generated at block 1005).

At block 1025, the phase of N−1 laser beams of the plurality of laser beams generated at block 1005 is changed to increase a power of the central laser beam. N is the number of the plurality of laser beams generated at block 1005. For example, when two laser beams are being combined, the phase of one of the laser beams would be changed relative to the other laser beam. In some embodiments, the power of the central laser beam is maximized.

System

Figure 11:
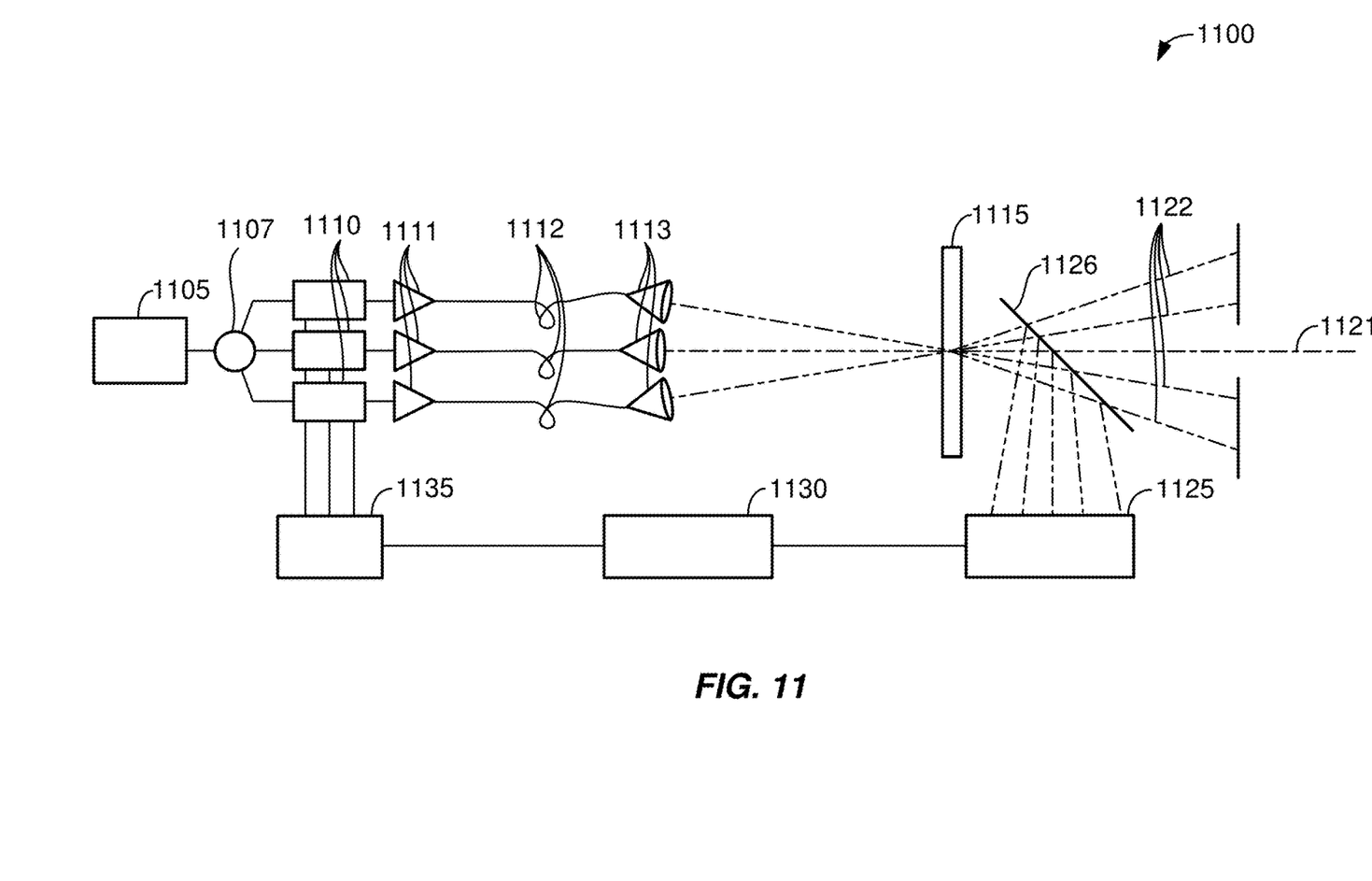
FIG. 11 shows an example of a schematic illustration of a system operable to combine laser beams.

FIG. 11 shows an example of a schematic illustration of a system operable to combine laser beams, specifically continuous-wave laser beams. Embodiments of the system 1100 shown in FIG. 11 can be used to combine pulsed laser beams, implementing embodiments of the method 1000 shown in FIG. 10.

The optical system 1100 includes an optical source 1105, a plurality of phase shifters 1110, a diffractive optical element 1115, a detection device 1125, a processor 1130, and a driver 1135. The optical source 1105 is operable to generate a plurality of laser beams. Each laser beam of the plurality of laser beams is a continuous-wave laser beam. In some embodiments, the optical source 1105 generates a single laser beam which passes through a beam splitter 1107 to generate the plurality of laser beams. In some embodiments, the optical source 1105 comprises a plurality of optical sources, with each optical source generating one of the plurality of laser beams.

Each phase shifter of the plurality of phase shifters 1110 is operable to shift a phase of one of the plurality of laser beams generated by the optical source 1105. That is, there is one phase shifter for each of the plurality of laser beams generated. In some embodiments, the plurality of phase shifters 1110 comprise fiber phase shifters or free space phase shifters. In some embodiments, each of the plurality of laser beams generated by the optical source 1105 passes through an amplifier 1111 and a collimator 1113 before the diffractive optical element 1115. In some embodiments, the laser beams travel from an amplifier 1111 to a collimator 1113 via an optical fiber 1112.

The diffractive optical element 1115 is operable to receive the plurality of laser beams and then to diffract the plurality of laser beams to generate a plurality of output laser beams including a central laser beam and a plurality of side laser beams. In some embodiments, the diffractive optical element 1115 comprises a transmissive optical element.

The detection device 1125 is operable to measure a power of at least two of the plurality of output laser beams 1122. In some embodiments, a beam splitter 1126 is used to direct the plurality of output laser beams 1122 to the detection device 1125. In some embodiments, the detection device 1125 comprises a camera (e.g., a far-field camera) or a photodiode array.

The processor 1130 and the driver 1135 comprise the control system of the optical system. The processor 1130 may be part of a computing system. The processor 1130 is operable to determine a phase error in laser beams of the plurality of laser beams from the power of the at least two of the plurality of output laser beams. This phase error information is used to instruct the driver 1130 to direct a phase shifter of the of the plurality of phase shifters 1110 to change the phase of N−1 laser beams of the N laser beams generated by the optical source 1105 to increase a power of the central laser beam 1121. In some embodiments, the driver 1130 includes a field-programmable gate array (FPGA), a digital-to-analog converter (DAC), and piezoelectric amplifiers.

CONCLUSION

Further details regarding the embodiments described herein can be found in the following publications:

Q. Du et al., "Stabilization of Diffractive Beam Combining Using Pattern Recognition," in Conference on Lasers and Electro-Optics, OSA Technical Digest (Optical Society of America, 2019), paper SM4E.5;

Q. Du et al., "Deterministic stabilization of eight-way 2D diffractive beam combining using pattern recognition," Optics Letters, Vol. 44, Issue 18, pp. 4554-4557 (2019);

Qiang Du et al., "81-beam coherent combination using a programmable array generator," Opt. Express 29, 5407-5418 (2021); and D. Wang et al., "Stabilization of the 81-channel coherent beam combination using machine learning," Opt. Express 29, 5694-5709 (2021);

all of which are herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

REFERENCES

The following references are herein incorporated by reference:

1. H. Pei, J. Ruppe, S. Chen, M. Sheikhsofla, J. Nees, Y. Yang, R. Wilcox, W. Leemans, and A. Galvanauskas, in *Advanced Solid State Lasers* (2017), paper AW4A-4.

2. T. Zhou, T. Sano, and R. Wilcox, Opt. Lett. 42, 4422 (2017).
3. T. Zhou, Q. Du, T. Sano, R. Wilcox, and W. Leemans, Opt. Lett. 43, 3269 (2018).
4. P. Zhou, Z. Liu, X. Wang, Y. Ma, H. Ma, X. Xu, and S. Guo, IEEE J. Sel. Top. Quantum Electron. 15, 248 (2009).
5. S. J. Augst, T. Fan, and A. Sanchez, Opt. Lett. 29, 474 (2004).
6. J. R. Leger, G. J. Swanson, and W. B. Veldkamp, Appl. Opt. 26, 4391 (1987).
7. J. E. Rothenberg and G. D. Goodno, Proc. SPIE 7686, 768613 (2010).

What is claimed is:

1. An optical system comprising:
    an optical source operable to generate a plurality of laser beams, each laser beam of the plurality of laser beams being a continuous-wave laser beam;
    a plurality of phase shifters, each phase shifter operable to shift a phase of one of the plurality of laser beams generated by the optical source;
    a diffractive optical element, the diffractive optical element operable to receive the plurality of laser beams and to diffract the plurality of laser beams to generate a plurality of output laser beams including a central laser beam and a plurality of side laser beams;
    a detection device operable to measure a power of at least two of the plurality of output laser beams; and
    a control system operable to determine, using a deconvolution method, a phase error in a laser beam of the plurality of laser beams from the power of the at least two of the plurality of output laser beams, and operable to direct N−1 phase shifters of the plurality of phase shifters to change a phase laser beams of the plurality of laser beams to increase a power of the central laser beam, with N being a number of the plurality of laser beams generated by the optical source.

2. The optical system of claim 1, wherein the detection device comprises a camera or a photodiode array.

3. The optical system of claim 1, wherein the optical source comprises a plurality of optical sources.

4. The optical system of claim 1, wherein the diffractive optical element comprises a transmissive optical element.

5. A method comprising:
    (a) generating a plurality of laser beams, each laser beam of the plurality of laser beams being a continuous-wave laser beam, the plurality of laser beams being coherent, each laser beam of the plurality of laser beams having a phase, and each laser beam of the plurality of laser beams converging at a point;
    (b) receiving the plurality of laser beams at the point at a diffractive optical element, the diffractive optical element diffracting the plurality of laser beams to generate output laser beams including a central laser beam and a plurality of side laser beams;
    (c) measuring a power of at least two of the plurality of the plurality of output laser beams generated by the diffractive optical element;
    (d) determining, using a deconvolution method, a phase error in laser beams of the plurality of laser beams from the power of the at least two of the plurality of output laser beams; and
    (e) changing the phase of N−1 laser beams of the plurality of laser beams generated in operation (a) to increase a power of the central laser beam, with N being a number of the plurality of laser beams generated in operation (a).

6. The method of claim 5, wherein laser beams of the plurality of laser beams are arranged in a one-dimensional array or a two-dimensional array prior to converging at the point.

7. The method of claim 5, wherein the power of the central laser beam is maximized.

8. The method of claim 5, wherein a power of each laser beam of the plurality of laser beams is about 0.1 milliwatts to 10 kilowatts.

9. The method of claim 5, wherein the measuring the power is performed with a camera or a photodiode array.

10. The method of claim 5, wherein the diffractive optical element comprises a transmissive optical element.

11. The method of claim 5, wherein the plurality of laser beams is generated by a single laser beam passing through a beam splitter.

12. The method of claim 5, wherein the plurality of laser beams is generated by a plurality of optical sources.

13. The optical system of claim 1, wherein the plurality of phase shifters comprise fiber phase shifters or free space phase shifters.

14. The optical system of claim 1, wherein the power of the central laser beam is maximized.

15. The optical system of claim 1, wherein a power of each laser beam of the plurality of laser beams is about 0.1 milliwatts to 10 kilowatts.

16. The optical system of claim 1, further comprising:
    a beam splitter, the beam splitter operable to generate the plurality of laser beams from a single laser beam from the optical source.

17. The optical system of claim 1, further comprising:
    a plurality of amplifiers, wherein each amplifier is operable to amplify one of the plurality of laser beams from each of the phase shifters; and
    a plurality of collimators, wherein each collimator is operable to collimate one of the plurality of laser beams from each of the amplifiers.

18. The optical system of claim 17, wherein a plurality of optical fibers transport each laser beam of the plurality of laser beams from the plurality of amplifiers to the plurality of collimators.

19. The optical system of claim 1, further comprising:
    a beam splitter, the beam splitter operable to direct the plurality of output laser beams to the detection device.

20. The optical system of claim 1, wherein the control system includes a field-programmable gate array (FPGA), a digital-to-analog converter (DAC), and piezoelectric amplifiers.

* * * * *